PROCESS FOR FORMING SUPERCONDUCTIVE MATERIALS
Filed June 1, 1965
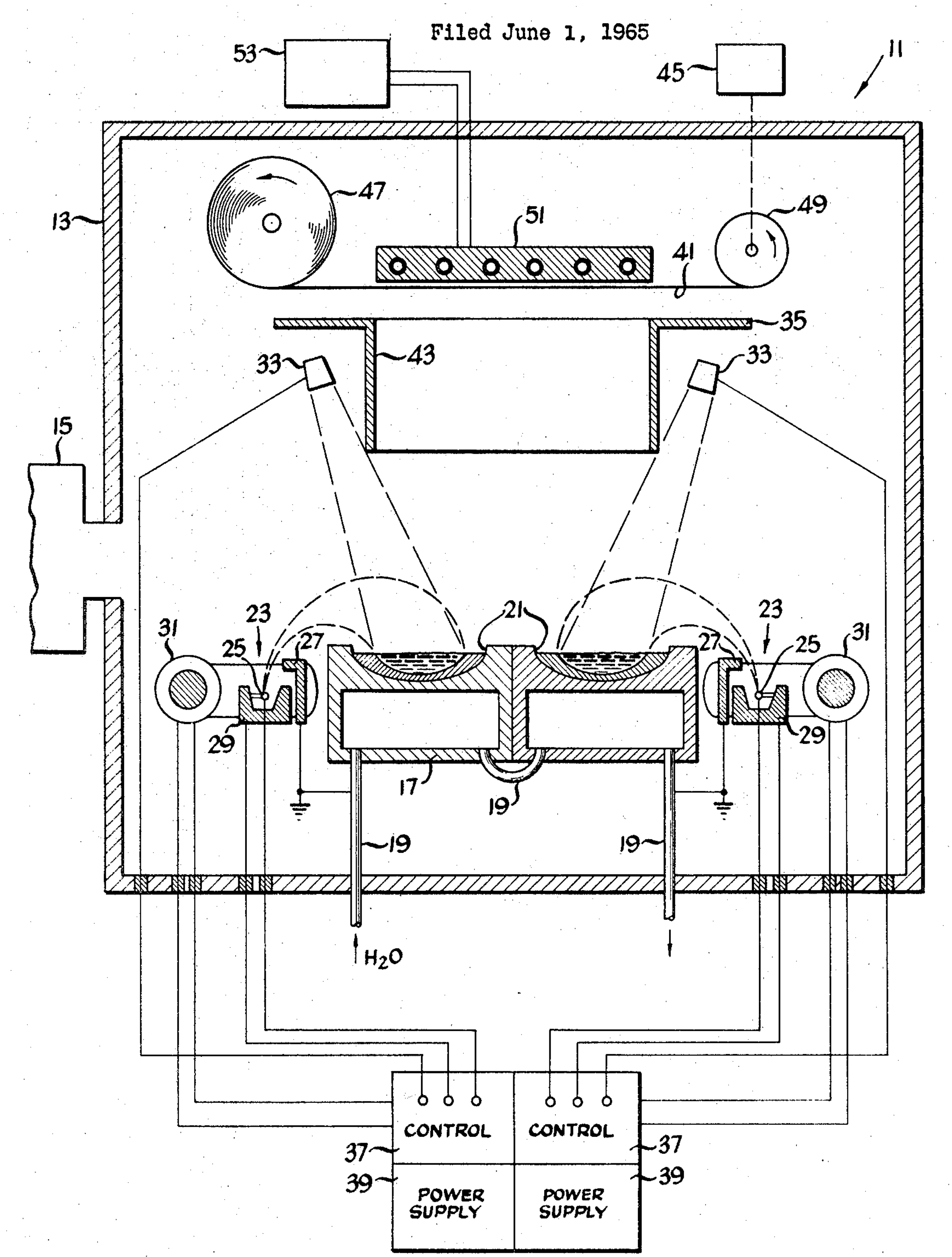
Inventors
BJORN S. RUMP
ROBERT H. HAMMOND
CHARLES H. MEYER, JR.
By Anderson, Luedeka, Fitch, Even & Tabin
Atty's United States Patent Office 3,549,416 Patented Dec. 22, 1970

3,549,416

PROCESS FOR FORMING SUPERCONDUCTIVE MATERIALS

Bjorn S. Rump, Chene-Bourgeries, Switzerland, and Robert H. Hammond, San Diego, and Charles H. Meyer, Jr., Del Mar. Calif., assignors, by mesne assignments, to Gulf Energy & Environmental Systems, Inc., San Diego, Calif., a corporation of Delaware Filed June 1, 1965, Ser. No. 460,206
Int. Cl. B44d *1/18;* C23c *13/02*
U.S. Cl. 117—227 1 Claim

ABSTRACT OF THE DISCLOSURE

A process from the formation of superconductive niobium$_3$tin having a transition temperature of at least about 17° K. employs simultaneous evaporation of niobium and tin from separate sources using electron bombardment heating and vacuum conditions of about $10^{-5}$ torr. Codeposition is carried out on a heated substrate having a temperature of about 850° C. Uniformity and relatively high transition temperatures of the superconductive material are accomplished by maintaining the relative rates of deposition between about 1.95 and about 2.15 (niobium to tin), the rate of deposition of niobium at least about 160 A. per second and the rate of tin deposition at at least about 80 A. per second.

This invention relates to a process for forming superconductive materials by vacuum deposition, and more particularly to an improved process for forming thin superconductive films.

At temperatures near absolute zero, the electrical resistivity becomes immeasurably small for certain metals, alloys, and chemical compounds. These materials are defined as superconductors.

The transition of a material from its normal resistive properties to a state of superconductivity depends principally upon its temperature and the magnetic field at the surface of the metal. Of course, the superconductive state of the material exists at temperatures less than the transition temperature as well as it does for magnetic fields less than the critical magnetic field. However, for economically practical purposes, it is often important that the transition temperature of a superconductor is as high as possible to ease the necessity for achieving temperatures very close to absolute zero.

Moreover, it is also often important that superconductors should have transition temperatures of a definite value. The transition temperature of a superconductor is considerably affected by impurities in the material. In many instances, a fraction of a percent of impurities within the material will lower the transition temperature 1° K. Processes for producing superconductors which have reproducible transition temperatures are desired.

There are many applications which require superconductors in the form of films within the range of hundreds of angstroms to hundreds of microns in thickness, such as compact high-field solenoids, superconductive magnets, and high inductance coils which carry high current. It is also desirable to produce superconductive materials in the form of films which have excellent current-carrying capability.

It is a principal object of the present invention to provide an improved process for the production of superconductive materials. It is another object of the invention to provide a process for producing extremely pure superconductive materials which have relatively high transition temperatures. It is a further object of the invention to provide a process for the production of superconductive materials in the form of films which have excellent current-carrying capability. Still another object of the invention is to provide a process for the economical production of superconductive films having transition temperatures within narrow tolerances. It is a still further object of the invention to provide a process for producing superconductive films of superconductive compounds or alloys utilizing electron beam evaporation. These and other objects of the invention are more particularly set forth in the following detailed description and in the accompanying drawing which schematically shows apparatus suitable for carrying out processes embodying various features of the invention.

It has been found that, by the simultaneous and controlled evaporation of the elements of a superconductive compound or alloy from two or more sources under high vacuum conditions, superconductive films having a thickness within the range of hundreds of angstroms to hundreds of microns with relatively high transition temperatures and excellent current-carrying capabilities may be formed. Unless otherwise stated the term film as used herein shall mean a film having a thickness within the aforementioned range, usually less than a millimeter. The simultaneous evaporation of a plurality of elements from separate sources can be closely controlled so as to deposit these elements upon a substrate in the proportions required to form a chemical compound or to form an alloy of precise composition. The process is considered especially suitable for the production of $Nb_3Sn$ by evaporation from separate sources of niobium and tin. It is practical to produce films of $Nb_3Sn$, having transition temperatures above 17° K. and having excellent current-carrying capability.

It has been found that control of the operating parameters within fairly narrow limits permits economical production of superconductive films with such purity and uniformity that the resultant transition temperatures are within very narrow tolerances and the films have the desired current-carrying characteristics.

One type of apparatus in which the process of the invention can be suitably performed is illustrated in the accompanying drawing. It should be clearly understood, however, that the process of the invention is not limited to performance within this apparatus and that equivalent apparatus suitable for deposition by controlled vacuum evaporation from a plurality of sources may also be used.

Referring specifically to the drawing, the schematic illustration shows an electron beam furnace 11 which includes an outer enclosure 13 that is designed to permit evacuation to low pressures, viz, less than a micron of mercury. Means are provided for suitably evacuating the enclosure, such as a fairly large conduit 15 which leads to a suitable vacuum pump (not shown). Supported within the enclosure is a hearth 17 which may, if desired, be provided with a cooling system 19 that circulates a suitable coolant, such as cold water, therethrough during operation of the furnace to keep the hearth material at a relatively cool temperature. A plurality of cavities 21 are formed in the top of the hearth 17 which serve as crucibles wherein the substances to be evaporated are disposed. Means (not shown) may also be provided for feeding raw material into the crucibles 21 to facilitate continuous operation of the apparatus.

An electron gun 23 is provided in association with each of the crucibles 21 to provide sufficient electron bombardment to heat the substance in each crucible to the desired temperature for evaporation. Control of each electron gun 23 to provide the precise rate of evaporation desired is described hereinafter. In the schematic illustration, the electron gun 23 is preferably located at about the same level or below the individual crucible. Although this is the preferred arrangement, other arrangements with the electron gun 23 at relatively higher locations may be used.

In the schematic illustration, each of the electron guns 23 comprises a filament 25 in the general shape of an elongated rod, an accelerating anode 27, and a focusing cathode 29. These components are well known in the art of electron guns, and any suitable construction of them may be employed.

In the illustrated embodiment, a U-shaped magnet 31 straddles each of the electron guns 23 and directs the stream of electrons which are given off onto the surface of the substance in the associated crucible 21. In general, the field from the U-shaped magnet 31 is generally perpendicular to the path of the electrons being given off from the electron gun 23 and deflects the electrons onto the surface of the material in the crucible 21 in a preselected pattern. Electron guns of this general type are disclosed in U.S. Pat. No. 3,132,198. As previously stated, such apparatus is only illustrative of the preferred embodiment of apparatus for carrying out the process of the invention and other suitable apparatus utilizing electron beam bombardment or other controllable types of heating may be used.

To precisely control the rate of evaporation from each of the crucibles 21, suitable monitoring means 33 is provided. A quartz oscillator rate monitor or other suitable apparatus which can be calibrated to indicate the rate at which atoms leave the surface of a substance within a crucible 21 is employed. In the schematic illustration, the monitoring means 33 is mounted at a level vertically above the crucible. A separate monitor is associated with each of the crucibles 21. A baffle 35 restricts the field of each monitor 33 to the crucible 21 with which it is associated by effectively blocking the line of sight between each monitor 33 and the surface of the unassociated crucible 21.

A control system 37 is provided for separately regulating the evaporation rates of the substances in the separate crucibles 21. Associated with each of the electron guns 23 is a power supply 39 and circuitry for carrying the power from the power supply 39 to the respective electron gun 23. Circuitry within the power supply permits precise regulation of the amount of power supplied to each electron gun 23. A circuit between the associated monitor 33 and power supply 39 utilizes feedback from the monitor 33 to proportionally increase or decrease the power being supplied to the electron gun 23 in order to maintain evaporation of the substance in the associated crucible at precisely the desired rate.

The control system 37 for each power supply 39 may be manually set to provide the desired evaporation rate. Alternately, some master control may be provided whereby the ratio of the rates of evaporation of materials in the separate crucibles 21 might be maintained at a preselected value even though the absolute rates of evaporation might be changed by some other control. Circuitry which accomplishes this function is well known to those skilled in the art and such accordingly is not herein described in detail inasmuch as any such suitable apparatus which performs this function may be used.

A substrate 41 upon which the superconductive material is deposited is located near the top of the enclosure, aligned generally vertically above the crucibles 21. Although in the schematic illustration, the distance between the substrate 41 and the crucibles 21 might appear to be considerable, in normal operation, the distance is usually about 5 to about 50 centimeters. In the schematic illustration, the substrate 41 is shown as being in the form of a sheet-like roll which is adapted to be driven continuously past an opening 43 in the baffle 35 at a selected rate of speed by a motor (not shown) and a control device 45. Using this type of substrate, a long strip of superconductive film is produced, the thickness of which film is governed by the rate of speed of the substrate 41 and the rate of evaporation of the substances from the crucibles 21. Although in the schematic illustration, the feed roll 47 and the takeup roll 49 of the substrate drive system are shown located within the enclosure 13, it may be pointed out that it is well within the skill of the art to place the rolls 47, 49 outside the enclosure 13 and use suitable seals at the walls of the enclosure to permit entrance and exit of the substrate 41 without destroying the vacuum.

Associated with the substrate 41 is suitable heating means 51 for regulating the temperature of the substrate whereupon the deposition of the superconductive material occurs. To produce a superconductive film having the properties desired, it is important that the substrate 41 is maintained at a predetermined temperature. Any suitable heating means may be employed. In the schematic illustration, a simple resistance-type heater 51 is depicted. A control system 53 is provided for monitoring the temperature of the substrate 41 and for controlling the power supplied to the heating means 51 to maintain this temperature at the desired level.

The particular substrate 41 employed is dependent upon the superconductive material being produced. A material is used which does not chemically interact with the superconductive material and which is unaffected by the temperatures to which it is heated. In most instances, either metal or ceramic substrates are employed. Examples of suitable substrates include, but are by no means limited to, fused aluminum oxide, fused magnesium oxide, stainless steel and tantalum.

In a process wherein simultaneous evaporation of the plurality of substances from separate sources is employed to produce a product of precise composition, the ratio of rates of deposition is important. Of course, the specific numerical ratio depends upon the particular composition of the alloy or compound being formed. It has been found that a superconductive film of $Nb_3Sn$ can be suitably formed by the above-described process. In producing films of materials such as this, it is meaningful to speak of the deposition rate in terms of angstroms per second. To successfully deposit $Nb_3Sn$ having a transition temperature in the desired range and having very good current-carrying capability, it has been found that the ratio of the rate of deposition of niobium to the rate of deposition of tin should be between about 1.95 and about 2.15.

The absolute rate of deposition of the particular substances upon the substrate 41 is dependent upon the vacuum. If the pressure within the enclosure 13 is about $10^{-5}$ torr (1 torr=1 mm. of Hg), the rate of deposition of tin should be at least about 80 A. per second, making the rate of deposition of niobium correspondingly at least about 160 A. per second. If the vacuum is maintained at even higher levels, for example a pressure of about $10^{-7}$ or $10^{-8}$ torr, proportionately lower rates of deposition may be employed without adversely affecting purity and properties of the superconductive film produced.

Because it is not considered convenient to measure the rate of deposition of either niobium or tin directly, the measurements are made indirectly via the monitoring means 33. Because the rate of deposition of either substance is directly proportional to its rate of evaporation, measurements made by the monitoring means 33 which indicate rates of evaporation can be calibrated to reflect rates of deposition.

Under the given conditions set forth above, the arrival rate of the niobium and tin atoms which form the compound $Nb_3Sn$ at the substrate 41 is approximately 100 times larger than the arrival rate of any residual gas molecules within the enclosure 13. Maintenance of these conditions prevents the excessive formation of any undesired compounds on the substrate 41 as a result of reaction between the metals being evaporated with oxygen, nitrogen, hydrogen, carbon dioxide, methane, or other molecules which might comprise a residual gas. Because the superconductive properties of a film deteriorate with the increasing percentage of impurities, it is important that any such excessive formation be avoided. It is also important that the substances being evaporated should also have good purity. For example, niobium having about 30 parts per million of impurities is acceptable.

Even with sophisticated control equipment, it is difficult to control the rates of deposition of a plurality of substances to the fine accuracy necessary to prevent small fluctuations in stoichiometry of the resultant compound. However, by maintaining the substrate 41 at a relatively high temperature, sufficient diffusion is assured in the deposited film to equalize small fluctuations in stoichiometry and thus keep the resultant superconductive film uniform throughout and within the desired tolerances for physical properties. By using a ceramic sheet of fused $Al_2O_3$ or a sheet of stainless steel, tantalum or other suitable metal as a substrate for deposition of $Nb_3Sn$, it has been found that a temperature of about 850° C. suffices.

The following example illustrates one process embodying various features of the invention.

EXAMPLE

An electron beam furnace 11 similar to that schematically shown in the drawing is employed which includes a hearth 17 having formed therein two separate crucibles 21. Within the one crucible, there is disposed a quantity of vacuum-melted niobium having 30 parts or less per million of impurities. In the other crucible, there is disposed a quantity of vacuum-melted tin having 10 parts or less per million of impurities. The enclosure is evacuated to a pressure of about $10^{-5}$ torr.

A plurality of substrate strips 41 are disposed in a parallel arrangement about 25 centimeters vertically above the surface level of the two crucibles 21. Long rolls of tantalum ribbon about one-thousandth of an inch thick are employed as the substrate strips 41. The substrate heater 51 is adjusted to maintain the portion of the substrate strips 41 where deposition occurs at a temperature of about 850° C. The baffle opening 43 permits the plurality of moving strips of substrate material to be coated simultaneously.

Power is supplied to the electron guns 23 and the magnets 31 are adjusted, if necessary, to focus the streams of electrons onto the respective surfaces of the niobium and the tin within the crucibles 21. A molten pool of niobium and a molten pool of tin soon form in the respective crucibles 21, and evaporation begins. The power supply controls 37 are adjusted so that sufficient niobium is evaporated to cause a rate of deposition on the substrate 41 of about 160 A./sec. and so that the rate of deposition of the tin is about 80 A./sec. Quartz oscillator rate monitors 33 are used to measure the rate of evaporation. Each of the monitors has been previously calibrated to determine precisely what density of atoms leaving the molten surface of the substance in the crucible 21 produces the desired rate of deposition on the substrate 41 in this environment. The feedback from the monitors 33 instigates any small adjustments to the power supply of the electron gun filaments 25 necessary to maintain the rate of deposition of each of the substances at the desired level.

As soon as the desired rates of deposition of each of the substances has been obtained, the drive control 45 for the takeup rool 49 of the substrate 41 is energized to move the substrate strips at a rate of about 0.2 cm./sec. past the opening 43 in the baffle 35 through which deposition takes place. With these rates of deposition of tin and niobium and this rate of speed for the substrate, a continuous strip of film about 10,000 angstroms in thickness is deposited upon each strip of the moving substrate 41.

Examination of the film-coated substrate strips shows that there is excellent adhesion of the film of the substrate. Critical current measurements are carried out for sections of this film-coated substrate taken from various locations along the length of the coated substrate strips. Excellent conformity between the values for the different sections is obtained. The transition temperatures of the films on each of these sections is measured by passing a current of 1 ma. therethrough in the absence of any magnetic field. The transition temperature of each of the film sections falls within the range of 17.7±0.5° K.

The films are examined by X-ray and electron diffraction and are found to be uniformly in the form of the compound in $Nb_3Sn$. The excellence of the uniformity achieved is attested by the narrow tolerances achieved in the transition temperatures. The current-carrying capability of each of the films is tested and found to be about $3\times10^6$ amps per cm.$^2$. A current-carrying capability of this magnitude makes the $Nb_3Sn$ film valuable for many superconductive applications.

Whereas the above example illustrates the production of an endless strip of superconductive film deposited upon a sheetlike substrate, deposition upon other types of substrates, as is well known in the art, is likewise considered to be within the scope of the invention. Suquential deposition of a base material preceding the deposition of the superconductive film and of a covering material after the deposition of the superconductive film is likewise within the scope of the application. For example, thin cylindrical, or spirally wound, films of superconductive film may be deposited upon a cylindrical mandrel by sequentially depositing a base upon the mandrel, followed by deposition of the superconductive film in the manner described in the example, and further followed, if desired, by the subsequent deposition of a covering film over the superconductive film.

Various of the features of the invention are set forth in the following claim.

What is claimed is:

1. A process for forming superconductive materials, which process comprises simultaneously evaporating niobium and tin from separate sources using electron bombardment under vacuum conditions wherein the background pressure is not more than about $10^{-5}$ torr, simultaneously depositing the atoms of niobium and tin thus evaporated upon a substrate heated to a temperature producing mobility of the deposited atoms, and separately continuously regulating the electron bombardment of said separate sources of niobium and tin to control the respective rates of evaporation threof and thereby maintain the ratio of the volume rate of deposition of said niobium to the volume rate of deposition of said tin between about 1.95 and about 2.15 and the rate of deposition of said niobium at least about 160 A./sec. and the rate of deposition of said tin at least about 80 A./sec., whereby superconductive $Nb_3Sn$ which is uniform in composition K. is built-up upon said substrate.

References Cited

UNITED STATES PATENTS 3,328,200 6/1967 Neugebauer -------- 117—213

FOREIGN PATENTS 882,174 7/1953 Germany ---------------- 117

OTHER REFERENCES 1,077,499 German Auslegeschrift "Koehler," March 1960.

WILLIAM L. JARVIS, Primary Examiner

U.S. Cl. X.R.

117—107; 204—192

UNITED STATES PATENT OFFICE

CERTIFICATE OF CORRECTION

Patent No. 3,549,416 Dated December 22, 1970

Inventor(s) Bjorn S. Rump et al.

It is certified that error appears in the above-identified patent and that said Letters Patent are hereby corrected as shown below:

Column 5, line 60 - for "rool", read "roll".

Column 5, line 68 - after "film" instead of "of", read "tc

Column 6, line 21 - for "Suquential", read "Sequential".

Column 6, line 46 - for "threof", read "thereof".

Column 6, line 52 - after "composition", insert "throughou
and has a transition temperature
of about 17°".

Signed and sealed this 20th day of April 1971.

(SEAL)
Attest:

EDWARD M.FLETCHER,JR.
Attesting Officer

WILLIAM E. SCHUYLER,
Commissioner of Paten